(12) United States Patent
Le Norcy et al.

(10) Patent No.: US 9,533,650 B2
(45) Date of Patent: Jan. 3, 2017

(54) AIRBAG DEVICE FOR MOTOR VEHICLES

(75) Inventors: Yohann Le Norcy, Valladolid (ES);
Jean-Christophe Peyre, Viana de Cega (ES); Ramon Ramos, Viana de Cega (ES)

(73) Assignee: TRW Automotive GmbH (DE)

( * ) Notice: Subject to any disclaimer, the term of this patent is extended or adjusted under 35 U.S.C. 154(b) by 88 days.

(21) Appl. No.: 14/001,724

(22) PCT Filed: Mar. 14, 2011

(86) PCT No.: PCT/EP2011/001245
§ 371 (c)(1),
(2), (4) Date: Feb. 10, 2014

(87) PCT Pub. No.: WO2012/122997
PCT Pub. Date: Sep. 20, 2012

(65) Prior Publication Data
US 2014/0232092 A1 Aug. 21, 2014

(51) Int. Cl.
| | | |
|---|---|---|
| *B60R 21/231* | (2011.01) | |
| *B60R 21/214* | (2011.01) | |
| *B60R 21/233* | (2006.01) | |
| *B60R 21/2338* | (2011.01) | |
| *B60R 21/235* | (2006.01) | |
| *B60R 21/00* | (2006.01) | |

(52) U.S. Cl.
CPC .............. *B60R 21/231* (2013.01); *B60R 21/214* (2013.01); *B60R 2021/0048* (2013.01); *B60R 2021/23192* (2013.01); *B60R 2021/23308* (2013.01); *B60R 2021/23386* (2013.01); *B60R 2021/23538* (2013.01)

(58) Field of Classification Search
CPC .............. B60R 21/231; B60R 21/205; B60R 2021/0048; B60R 2021/0004
USPC ......................................................... 280/743.1
See application file for complete search history.

(56) References Cited

U.S. PATENT DOCUMENTS

| | | |
|---|---|---|
| 5,316,337 A | 5/1994 | Yamaji et al. |
| 5,524,926 A * | 6/1996 | Hirai et al. ................ 280/743.1 |
| 6,361,073 B1 | 3/2002 | Ortmann |
| 2012/0098242 A1 | 4/2012 | Aranzulla et al. |

FOREIGN PATENT DOCUMENTS

| | | | |
|---|---|---|---|
| DE | 298 04 611 | 9/1998 | |
| DE | 10 2008 057 968 | 5/2010 | |
| JP | 8230592 | 8/1969 | |
| JP | 08-230592 | * 9/1996 | ............ B60R 21/16 |
| WO | 02/16174 | 2/2002 | |

* cited by examiner

*Primary Examiner* — Keith Frisby
(74) *Attorney, Agent, or Firm* — Tarolli, Sundheim, Covell & Tummino LLP

(57) ABSTRACT

The invention relates to a gas bag for vehicles, having a flat, two-dimensional shape when being in an uninflated, vented condition and a three-dimensional shape in an inflated condition, the gas bag having a main piece with opposite end portions, each of the end portions having an end contour, and two minor pieces which each have a connecting portion with a contour with corresponds to the end contour of the main piece, and which each have a filling portion, the two filling portions having similar shapes and similar dimensions. The invention also relates to a method of sewing this gas bag.

20 Claims, 7 Drawing Sheets

AIRBAG DEVICE FOR MOTOR VEHICLES

RELATED APPLICATIONS

This application corresponds to PCT/EP2011/001245, filed Mar. 14, 2011, the subject matter of which is incorporated herein by reference in their entirety.

BACKGROUND OF THE INVENTION

The invention relates to a gas bag for vehicles, having a flat, two-dimensional shape when being in an uninflated, vented condition and in a three-dimensional shape in an inflated condition. The invention relates in particular to a gas bag module with a gas bag which can be mounted at the roof of the vehicle and which, in an inflated condition, is arranged forward of a vehicle occupant, in particular between the windshield and the dashboard on the one hand and the vehicle occupant on the other hand. Gas bags which in an uninflated, vented condition have a two-dimensional shape offer advantages as regards their production. As the gas bag can be spread in a single plane, all fabric pieces from which the gas bag is made can be sewn together by using two-dimensional seams. These seams can simply be made when the pieces of the gas bag are spread out on a table.

SUMMARY OF THE INVENTION

The object of the invention is to provide a gas bag which can be manufactured by using a few pieces which are connected by a few seams, all seams being two-dimensional.

This object is solved by a gas bag for vehicles, having a flat, two-dimensional shape when being in an uninflated, vented condition and a three-dimensional shape in an inflated condition, the gas bag having a main piece with opposite end portions, each of the end portions having an end contour, and two minor pieces which each have a connecting portion with a contour which corresponds to the end contour of the main piece, and which each have a filling portion, the two filling portions having similar shapes and similar dimensions. This gas bag consists of three pieces only, which can be connected to each other by four seams. Accordingly, the gas bag can be manufactured at low cost.

According to a preferred embodiment, a tether is provided which divides the gas bag into an attachment portion and a restraining portion. Provision of the tether results in reduced loads acting on the head and neck of a vehicle occupant being restrained by the gas bag.

The invention also provides a method of sewing a gas bag which has a main piece with opposite end portions, each of the end portions having an end contour, and two minor pieces which each have a connecting portion with a contour which corresponds to the end contour of the main piece, and which each have a filling portion, the two filling portions having similar shapes and similar dimensions, the method comprising the following steps: First, the two minor pieces are sewn with their connecting pieces to the end portions of the main piece, a first of the minor pieces being sewn to a first surface of the main piece, while the second minor piece is being sewn to a second surface of the main piece. Then, the main piece is folded along its center line such that the first minor piece is inserted into a pocket between the second minor piece and the main piece such that the minor pieces lie one on top of the other. Then, the minor piece is folded along a line running through the end of the seams along the outer contour of the end portions of the main piece such that their filling portions form an extension of the main piece. Finally, seams are being formed along the outer edges of the main piece and along the edges of the connecting portions of the minor pieces. This method allows to manufacture the gas bag at low expenses.

The invention also provides a gas bag module for frontal impact which is arranged at the roof of a vehicle close to the windscreen.

Advantageous features of the invention are defined in the dependent claims.

BRIEF DESCRIPTION OF THE DRAWINGS

The invention will now be described with reference to two embodiments which are shown in the enclosed drawings. In the drawings

DESCRIPTION OF THE EMBODIMENT

Figure 1:
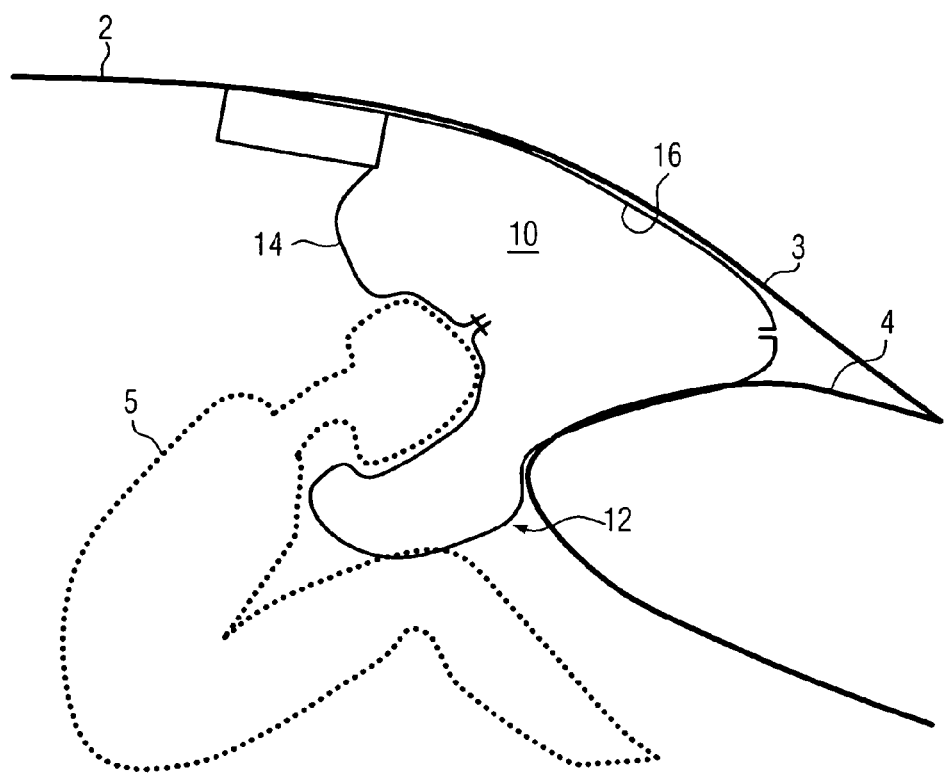
FIG. 1 shows a gas bag according to a first embodiment of the invention.

In FIG. 1, part of a vehicle with a roof 2, a windshield 3 and a dashboard 4 is shown. Further, a vehicle occupant 5 is depicted. At roof 2, a gas bag module with an inflator—not shown—and a gas bag 10 is arranged. In the inflated condition shown in FIG. 1 the gas bag extends between windshield 3, dashboard 4 and vehicle occupant 5.

Gas bag 10 is formed from three fabric pieces, namely a major piece 12 and two minor pieces 14, 16. Major piece 12 has a generally oval shape (please see FIG. 2a), with the ends which are arranged, in a longitudinal direction, opposite each other being referred to as end portions 18 having an end contour 20. The two minor pieces 14, 16 consist of a connecting portion 22, the shape of which corresponds to the respective end portion 18 of major piece 12, and a generally elongate filling portion 24. The end portions 18, connecting portions 22 and filling portions 24 are portions on a piece typically made from a fabric. There is no disruption or other mechanical feature which distinguishes the end portions, connecting portions and filling portions on the level of the fabric.

The two connecting portions 22 have the shape of a segment of a circle, ellipse, oval or similar form. In other words, they are delimited by a curved contour. The connecting portions 22 directly merge into the filling portions 24, with the contour having a break or sharp bend at the point where the contour of the connecting portion merges into the contour of the filling portion.

Figure 2:
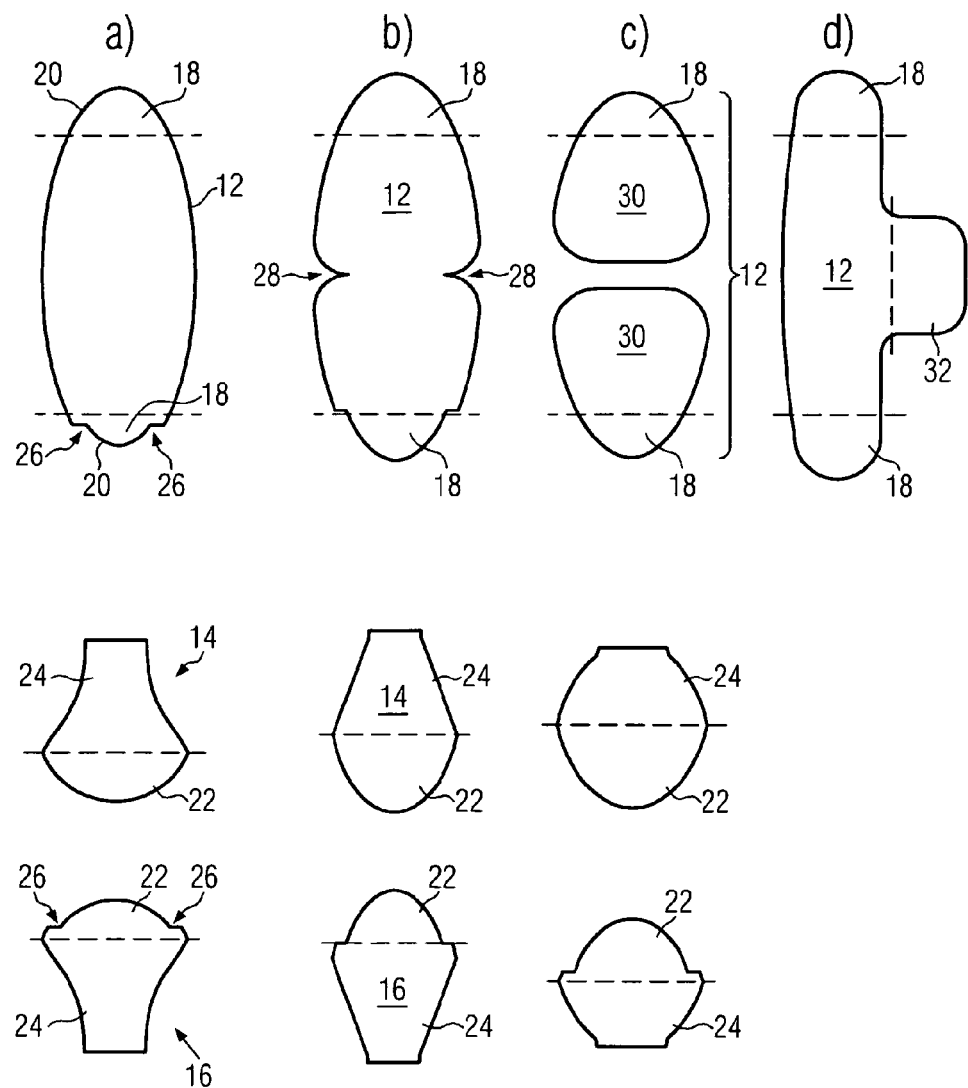
FIGS. 2a to 2c show different forms of the individual pieces from which the gas bag according to FIG. 1 is formed.
FIG. 2d shows another form of the main piece which can be used for the gas bag of FIG. 1, FIGS. 3a to 3c show the gas bag in a first manufacturing step in a top view, a side view and an enlarged top view.

The outer contour of the respective minor piece is later connected thereto. As can be seen in FIG. 2a, the outer contour of lower end portion 18 corresponds to the outer contour of connecting portion 22 of minor piece 16. In a similar manner, the outer contour of the upper end portion 18 of major piece 12 corresponds to the outer contour of connecting portion 22 of minor piece 14. Further, the shape and the dimensions (and therewith also the contour) of the two filling portions 24 of minor pieces 14, 16 correspond to each other.

The two connecting portions 22 of minor piece 14, 16 could be formed identically. In order to allow a clear identification of the minor pieces 14, 16 to the correct one of the end portions 18 of major piece 12, the outer contours of the end pieces 18 and the connecting pieces 22 are formed slightly different. In the shown embodiment, the outer contour of minor piece 16 is formed with two slightly recessed portions 26 which can also be found on the respective end portion 18 of major piece 12.

FIG. 2b shows different shapes of the major piece 12 and the minor pieces 14, 16. The main difference over the embodiment of FIG. 2a is a constriction 28 in the middle of the major piece 12.

FIG. 2c shows an embodiment in which the major piece 12 is formed from two halves 30 which together form the major piece.

In FIG. 2d, major piece 12 is formed with a lateral protrusion 32 which results in a gas bag which is suitable for two passengers at the same time.

Figure 3:
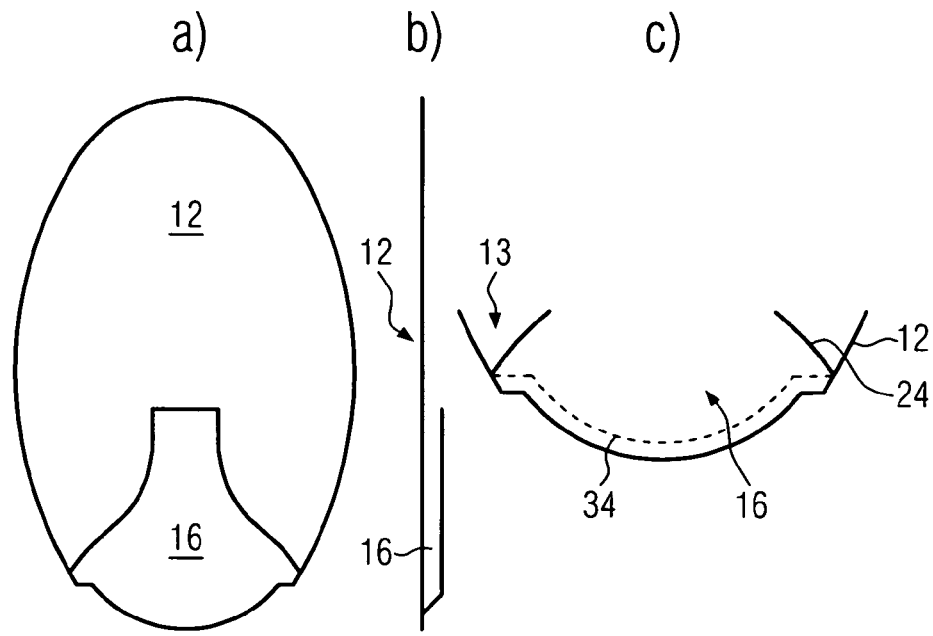

In a first step, minor piece 16 is arranged on major piece 12 such that the outer contour of connecting portion 22 of minor piece 16 coincides with end contour 20 of end portion 18 of major piece 12 (please see FIGS. 3a and 3b). Then, a seam 34 is formed along the outer contour of end portion 18 and connecting portion 22.

Figure 4:
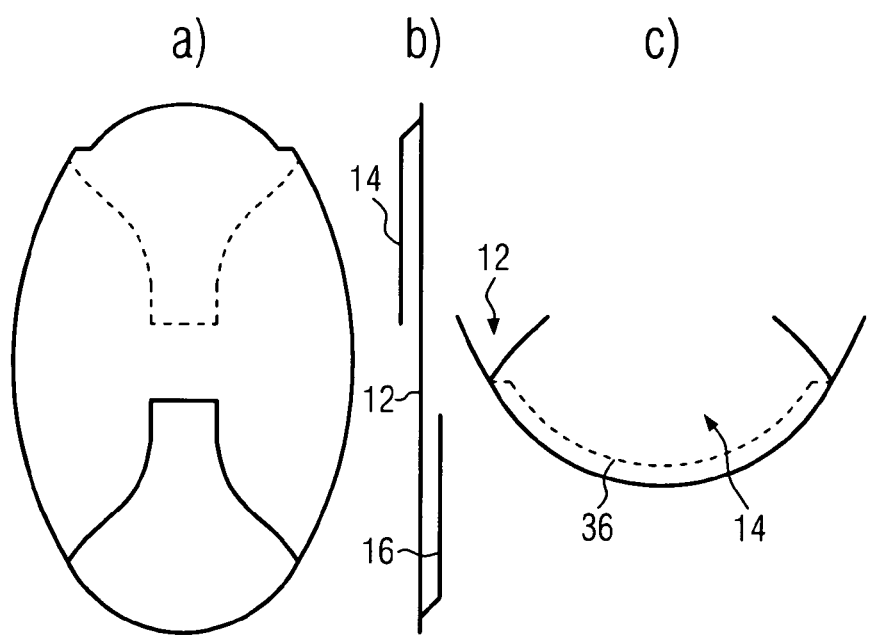
FIGS. 4a to 4c show in views similar to FIG. 3 the gas bag in a second manufacturing step.

In the next step, minor piece 14 is connected in a similar manner to the other end portion 18, with the second minor piece 14 being connected to major piece 14 on a side which is opposite to the side at which minor piece 16 is arranged (see in particular FIGS. 4a and 4b). A seam 36 is used for connecting the respective end portion 18 with connecting portion 22 of minor piece 14.

Figure 5:
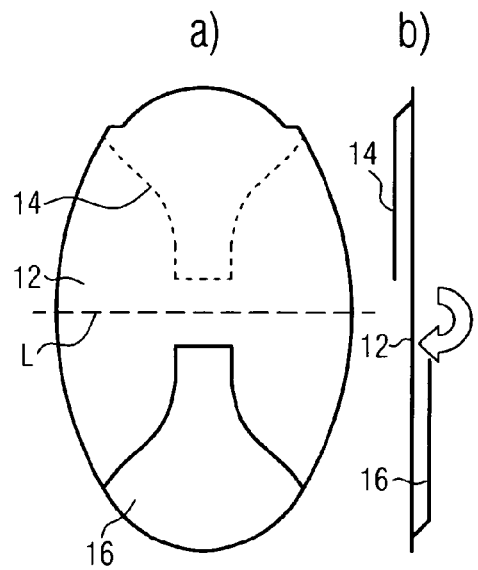
FIGS. 5a and 5b show a third manufacturing step in a top view and a side view.
Figure 6:
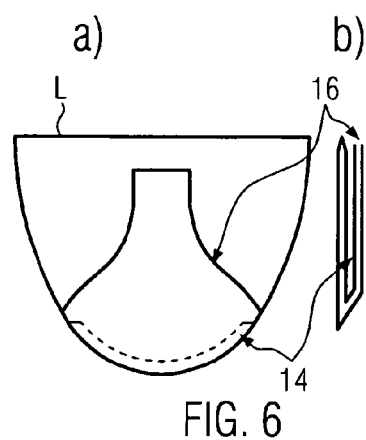
FIGS. 6a and 6b show the gas bag in a condition after the third manufacturing step.

In a next step which is depicted in FIGS. 5a and 5b, major piece 12 is folded along a center line L which divides the two halves of major piece 12 such that the half being provided with one of the minor pieces lies in the interior of a pocket formed by the other minor piece and the respective half of major piece 12. As can be seen in FIGS. 6a and 6b, the half of major piece 12 provided with minor piece 14 is folded by 180° around line L such that minor piece 14 lies in the pocket formed between minor piece 16 and major piece 12, with major piece 12 being double-walled.

Figure 7:
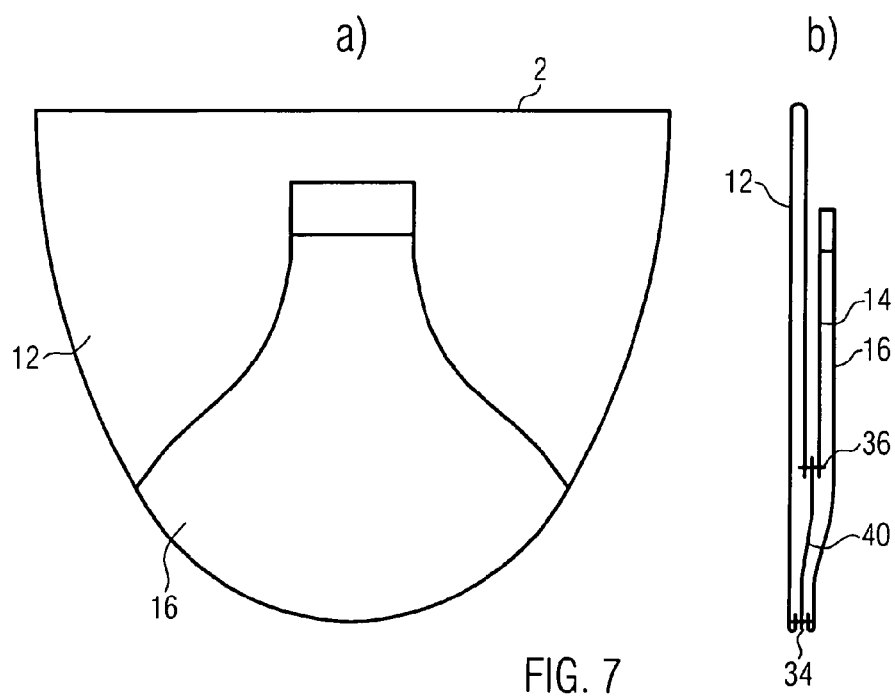
FIGS. 7a and 7b show in views similar to FIG. 6 a gas bag according to a second embodiment.

In FIGS. 7a and 7b an alternative embodiment is shown which uses a tether 40 provided between seam 32 and seam 34. Tether 40 can be formed from a separate fabric piece or could, in an alternative which is not depicted, be formed from extensions of major piece 14.

Figure 8:
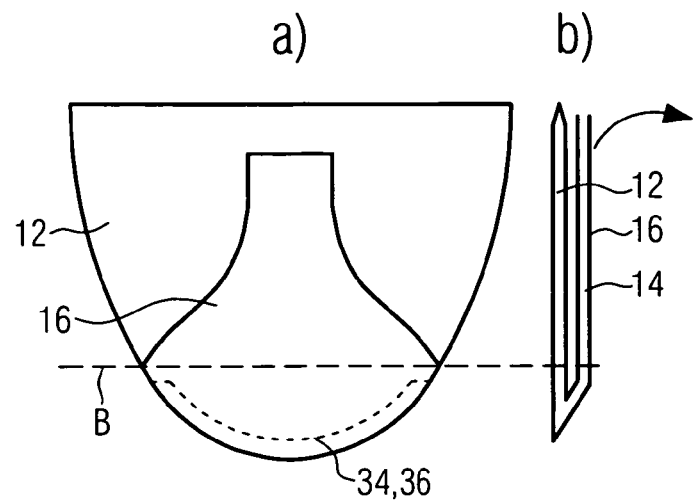
FIGS. 8a and 8b show in a top view and a side view a fourth manufacturing step.
Figure 9:
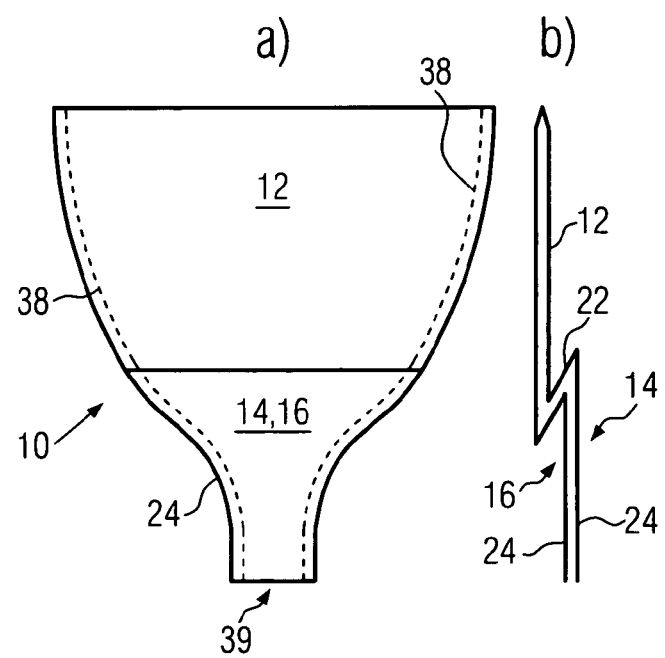
FIGS. 9a and 9b show in a top view and a side view a fifth manufacturing step.

In a next step which is schematically depicted in FIGS. 8a and 8b, filling portions 24 of minor pieces 14, 16 are folded along a bend line B so as to no longer be arranged on major piece 12, but to extend from the major piece. Bend line B is defined by the two ends of seams 34, 36. This results in the gas bag having the shape as shown in FIGS. 9a and 9b in which major piece 12 is folded so as to lie flat in two layers, with connecting portions 22 of minor pieces 14, 16 lying on end portions 18, and with filling portions 22 being folded away from major piece 12. In this condition in which the gas bag can be spread out flat in a plane, seams 38 are formed along the outer edges of major piece 12 and outer edges of filling portions 24, thereby closing the gas bag and leaving open only a filling opening 39. The rim of opening 39 can be used for attaching gas bag 10 to the vehicle roof.

Figure 10:
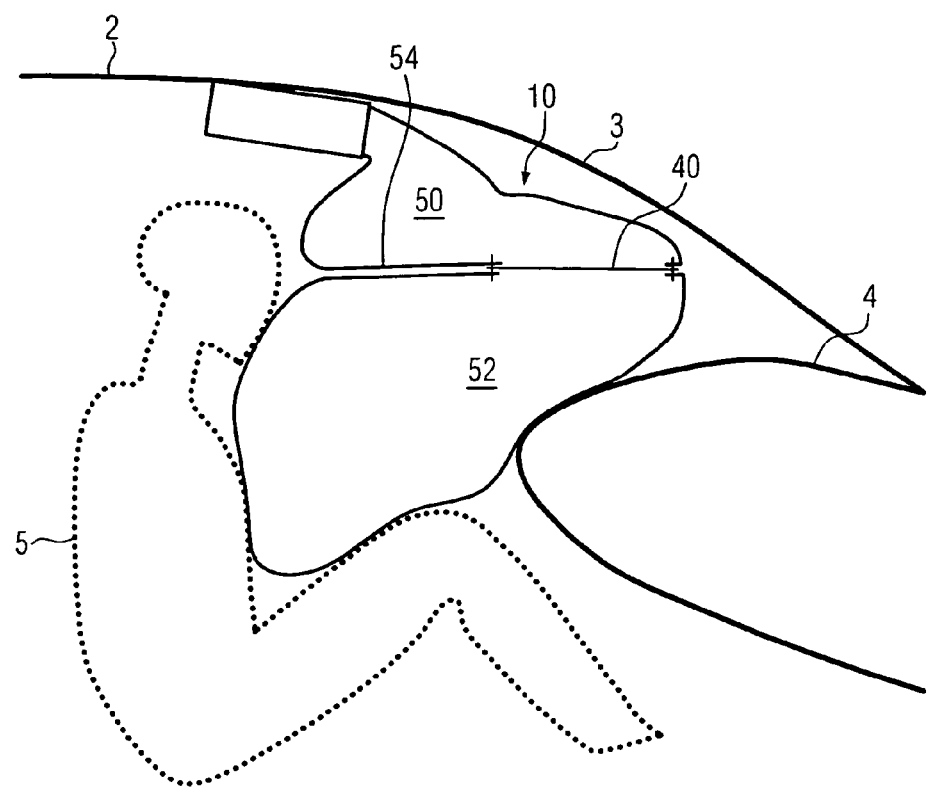
FIG. 10 shows in a schematic, sectional view a gas bag according to the second embodiment.
Figure 11:
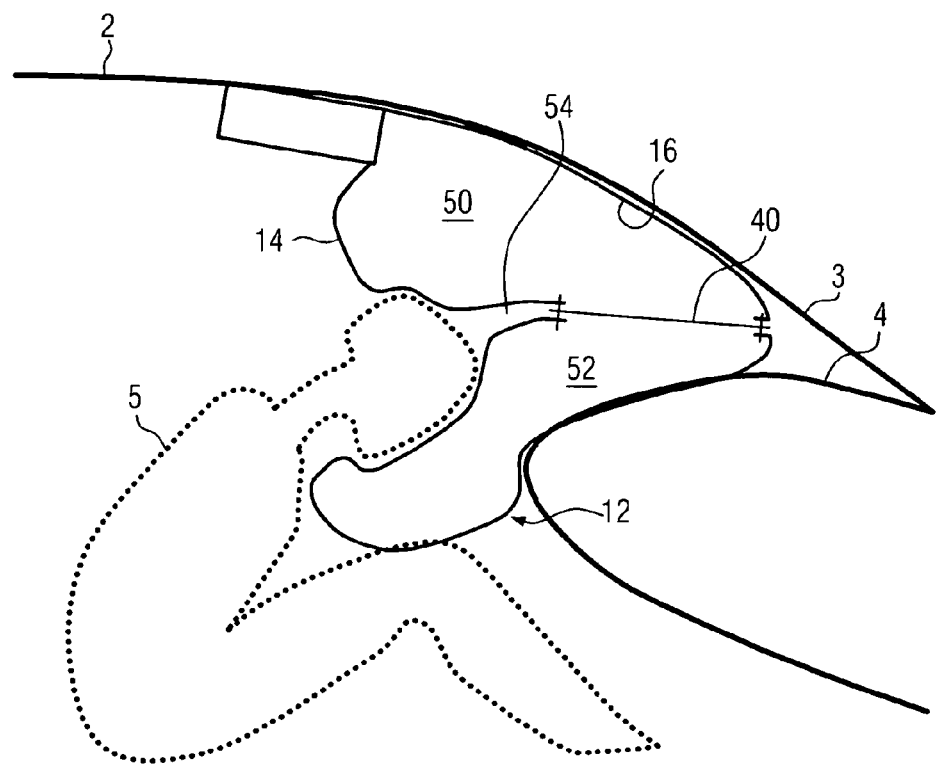
FIG. 11 shows the gas bag of FIG. 10 at an enlarged scale.

In FIGS. 10 and 11, the gas bag of FIGS. 7a and 7b, comprising tether 40, is shown in an inflated condition (please see FIG. 10) and with vehicle occupant 5 being restrained (please see FIG. 11). Tether 40 divides gas bag 10 into an attachment portion 50 and a restraining portion 52. It can be seen in FIG. 11 that vehicle occupant 5 is restrained by restraining portion 52 to gas bag 10 only, and that attachment portion 50 acts basically as a feeding zone whose function is only to provide gas to restraining portion 52. The pronounced constriction 54 which is formed by tether 40 results in the head of vehicle occupant 5 being smoothly supported without there being significant bending moments acting on the neck, the respective wall portion of restraining portion 52 to yield downwardly without being hindered by wall portions located above the head.

The invention claimed is:

1. A gas bag for vehicles, having a flat, two-dimensional shape when being in an uninflated, vented condition and a three-dimensional shape in an inflated condition, the gas bag having a main piece extending lengthwise along a centerline and including end portions at opposite ends of the main piece along the centerline, each of the end portions having an end contour, and two minor pieces which each have a connecting portion with a contour that corresponds to the end contour of the main piece, and which each have a filling portion, the two filling portions having corresponding shapes and dimensions, wherein the minor pieces are connected to the main piece such that the minor pieces traverse the centerline of the main piece, wherein one of the minor pieces is positioned entirely between the other of the minor pieces and the main piece when the gas bag is in the uninflated condition such that the one minor piece overlies the main piece and the other minor piece overlies the one minor piece.

2. The gas bag of claim 1 wherein the main piece has a generally oval shape.

3. A The gas bag of claim 1 wherein the filling portion of each minor piece is generally elongate and the connecting portion of each minor piece is generally in the shape of a segment of a circle.

4. A The gas bag of claim 1 wherein the filling portion of each minor piece is generally elongate and the connecting portion of each minor piece is generally in the shape of a segment of an ellipse.

5. The gas bag of claim 1 wherein a first seam is provided between the main piece and a first minor piece along the end contour of the main piece, a second seam being provided between the main piece and the second minor piece along the respective end contour of the main piece, and third and fourth seams being provided along the edges of the filling portions of the first and second minor pieces and along the remaining edges of the main piece.

6. A gas bag module for frontal impact which is arranged at a roof of a vehicle close to a windscreen and including a gas bag according to claim 1.

7. The gas bag of claim 1 wherein the end contours are different from one another.

8. The gas bag of claim 1 wherein the opposite end portions include a first end portion having a round end contour and a second end portion having a round end contour and at least one recessed portion.

9. The gas bag of claim 8 wherein the at least one recessed portion comprises a plurality of recessed portions.

10. The gas bag of claim 8 wherein the round end contour of the first end portion is larger than the round end contour of the second end portion.

11. The gas bag of claim 1 further comprising:
a first seam connecting the main piece to a first of the minor pieces along a first of the end contours of the main piece, the first seam extending across the centerline at a first position, and
a second seam connecting the main piece to a second of the minor pieces along a second of the end contours of the main piece, the second seam extending across the centerline at a second position.

12. The gas bag of claim 1 wherein the minor pieces are connected to the main piece using two-dimensional seams.

13. The gas bag of claim 1 wherein the minor pieces are connected to the main piece using only two-dimensional seams.

14. The gas bag of claim 1 wherein the main piece includes an axis of symmetry and each minor panel includes an axis of symmetry, the axes of symmetry of the main piece and the minor panels being co-extensive when the minor panels are connected to the main piece.

15. A gas bag for vehicles, having a flat, two-dimensional shape when being in an uninflated, vented condition and a three-dimensional shape in an inflated condition, the gas bag having a main piece extending lengthwise along a centerline and including end portions at opposite ends of the main piece along the centerline, each of the end portions having an end contour, and two minor pieces which each have a connecting portion with a contour that corresponds to the end contour of the main piece, and which each have a filling portion, the two filling portions having corresponding shapes and dimensions, wherein the minor pieces are connected to the main piece such that the minor pieces traverse the centerline of the main piece, wherein the main piece has a first surface and a second surface facing in opposite directions, a first of the minor pieces being secured to and abutting the first surface and a second of the minor pieces being secured to and abutting the second surface.

16. A gas bag for a vehicle comprising:
a main piece extending lengthwise along a centerline and having end portions at opposite ends of the centerline, each of the end portions having a rounded contour; and
first and second minor pieces each having a filling portion and a connecting portion shaped to the rounded contour of one of the end portions, each connecting portion being secured to a corresponding end portion by a two-dimensional seam such that the gas bag has a flat, two-dimensional shape when in an uninflated condition, the gas bag having a three-dimensional shape when in an inflated condition, wherein the first minor piece is positioned entirely between the second minor piece and the main piece when the gas bag is in the uninflated condition such that the one minor piece overlies the main piece and the other minor piece overlies the one minor piece.

17. The gas bag of claim 1 wherein the main piece includes an axis of symmetry and each minor panel includes an axis of symmetry, the axes of symmetry of the main piece and the minor panels being co-extensive when the minor panels are connected to the main piece.

18. A gas bag for a vehicle comprising:
an elongated main piece extending lengthwise along a centerline, the main piece having a first surface and an opposite surface and having first and second end portions at opposite ends of the centerline;
a first minor piece having a filling portion and a connecting portion, the connecting portion of the first minor piece being connected to the first end portion of the main piece on the first surface of the main piece and following the contour of the first end portion of the main piece, a first pocket being defined between the first surface of the main piece and the first minor piece; and
a second minor piece having a filling portion and a connecting portion, the connecting portion of the second minor piece being connected to the second end portion of the main piece on the second surface of the main piece and following the contour of the second end portion of the main piece, a second pocket being defined between the second surface of the main piece and the second minor piece;
wherein the main piece is folded along a first fold line transverse to the centerline and the second pocket is positioned inside the first pocket so that the first and second minor pieces overlie each other.

19. The gas bag recited in claim 18, wherein the overlying first and second minor pieces are folded along a second fold line transverse to the centerline so that the overlying filling portions of the first and second minor pieces are positioned outside the periphery of the main piece.

20. The gas bag recited in claim 19, wherein overlying portions of the main piece and overlying portions of the first and second minor pieces are interconnected along their peripheries to close the gas bag, leaving a terminal end of the overlying filling portions disconnected to provide a filling opening.

* * * * *